US007973431B2

(12) United States Patent
Feldmeier

(10) Patent No.: US 7,973,431 B2
(45) Date of Patent: Jul. 5, 2011

(54) CIRCUIT ARRANGEMENT FOR LOCKING AND/OR UNLOCKING A DOOR LOCK, ESPECIALLY IN AN ELECTRIC APPLIANCE

(75) Inventor: Rudolf Feldmeier, Plattling (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 316 days.

(21) Appl. No.: 12/086,036

(22) PCT Filed: Nov. 23, 2006

(86) PCT No.: PCT/EP2006/068792

§ 371 (c)(1),
(2), (4) Date: Jun. 3, 2008

(87) PCT Pub. No.: WO2007/065797

PCT Pub. Date: Jun. 14, 2007

(65) Prior Publication Data

US 2009/0139287 A1 Jun. 4, 2009

(30) Foreign Application Priority Data

Dec. 9, 2005 (DE) ......................... 10 2005 058 899

(51) Int. Cl.
*H01H 47/00* (2006.01)
*H02H 11/00* (2006.01)

(52) U.S. Cl. ........ 307/115; 307/113; 307/139; 307/326; 307/327; 307/328; 70/262; 70/263; 70/265; 361/189; 361/190

(58) Field of Classification Search .................. 307/113, 307/115, 139, 326, 327, 328; 361/189, 190; 70/262, 263, 265
See application file for complete search history.

(56) References Cited

U.S. PATENT DOCUMENTS

| | | | | |
|---|---|---|---|---|
| 3,857,002 | A * | 12/1974 | Lay et al. | 200/61.64 |
| 4,120,013 | A | 10/1978 | Simmons | |
| 4,466,044 | A * | 8/1984 | Fey | 361/152 |
| 5,245,260 | A * | 9/1993 | Duipmans | 318/446 |
| 5,375,027 | A * | 12/1994 | Bledsoe et al. | 361/87 |
| 5,747,884 | A | 5/1998 | Voehringer et al. | |
| 6,189,551 | B1 * | 2/2001 | Sargeant et al. | 134/200 |
| 6,447,081 | B1 | 9/2002 | Sargeant et al. | |

FOREIGN PATENT DOCUMENTS

| | | |
|---|---|---|
| DE | 1 610 247 | 11/1970 |
| DE | 2 106 273 | 8/1972 |
| DE | 88 05 157 U | 12/1988 |
| DE | 196 01 228 | 7/1997 |
| DE | 101 09 864 | 9/2002 |
| EP | 0 447 929 | 9/1991 |
| EP | 0 522 302 | 1/1993 |
| GB | 2 048 314 | 12/1980 |

* cited by examiner

*Primary Examiner* — Jared J Fureman
*Assistant Examiner* — Hal I Kaplan
(74) *Attorney, Agent, or Firm* — James E. Howard; Andre Pallapies

(57) ABSTRACT

A circuit arrangement for locking and/or unlocking a door lock, especially in an electric appliance that is provided with a door for closing or opening a work area. Said circuit arrangement comprises an electrically actuated door lock actuator which acts upon a locking member when a current flows through the actuator, said locking member locking or unlocking the door lock. A series connection that is composed of two switching devices is arranged in the triggering circuit of the door lock actuator, said two switching devices being controllable by the control device which emits output signals to actuate the two switching devices once specific triggering signals have been fed to the control device.

18 Claims, 1 Drawing Sheet

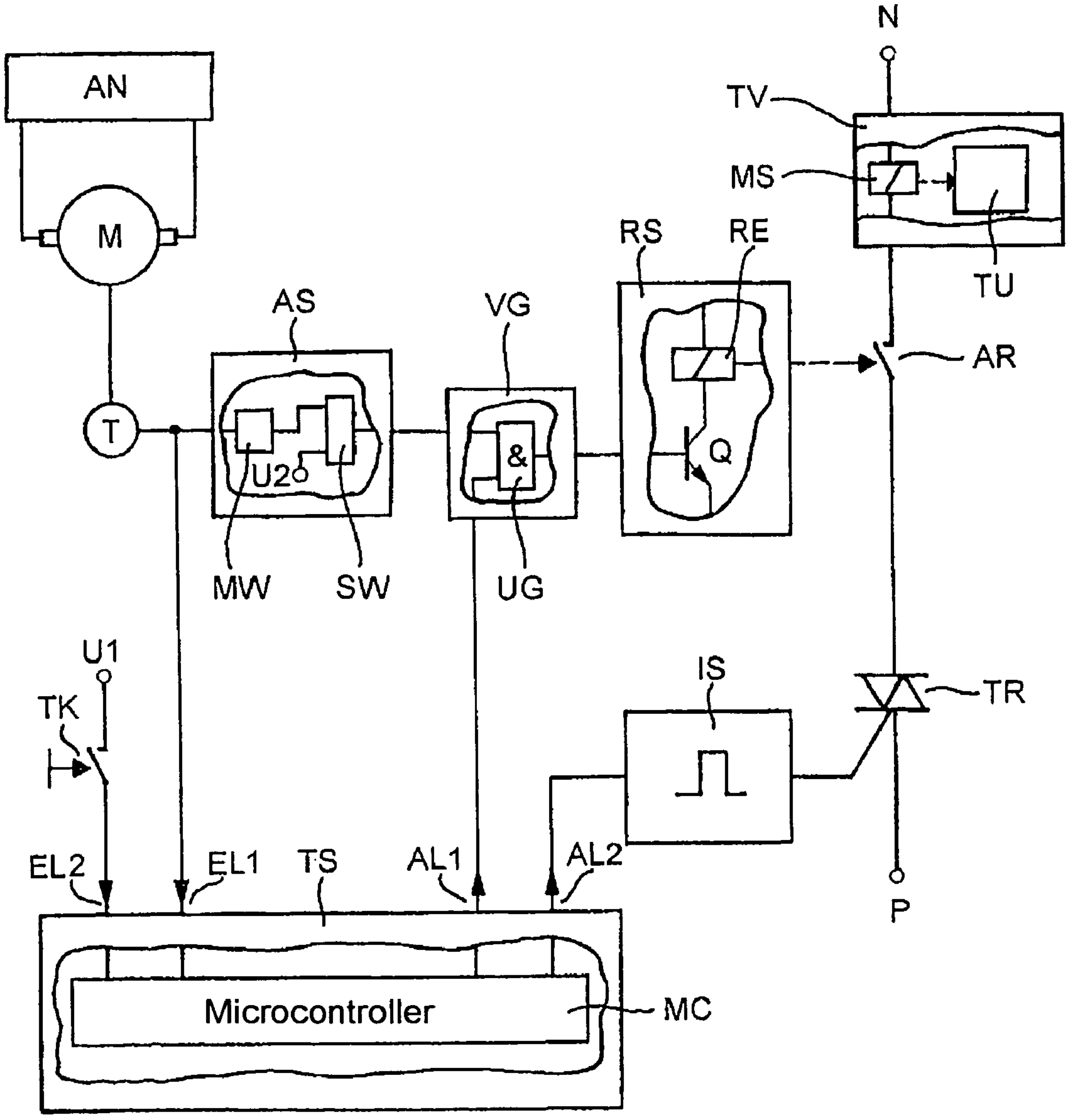
AN
M
T
AS
U2
MW
SW
VG
&
UG
RS
RE
Q
N
TV
MS
TU
AR
U1
TK
IS
TR
P
EL2
EL1
TS
AL1
AL2
Microcontroller
MC

CIRCUIT ARRANGEMENT FOR LOCKING AND/OR UNLOCKING A DOOR LOCK, ESPECIALLY IN AN ELECTRIC APPLIANCE

BACKGROUND OF THE INVENTION

The invention relates to a circuit arrangement for locking and/or unlocking a door lock, especially in an electric appliance that is provided with a door for closing or opening a work area, with an electrically-controllable door lock actuator which acts upon a locking member which locks or unlocks the door lock when a current flows through the actuator. With an electric appliance, such as an electric washing machine for example, such an electrically-controllable door lock is as a rule combined with a mechanically-actuatable door lock with which a door for closing or opening the work area of the relevant appliance is provided. Depending on its embodiment, the electrically-controllable door lock, once activated, acts on the mechanically-actuated door lock so that said lock cannot be actuated until the electrically-controlled door lock is either activated once again or is deactivated again.

A door with an electromagnetic closing/opening apparatus, especially for washing machines, is already known (DE OS 1 610 247), in which a lock connected to the housing of the washing machine possesses a bolt which engages with a lug on the door. The relevant bolt is released by means of an electromagnet controllable by a control device of the washing machine for opening said door or is secured for locking the relevant door. In this case an opening of the relevant door after the washing machine is put into operation is only possible after a delay, and only then once the washing machine has been stopped and the water drained out. However nothing is known in this connection about any measures for monitoring the operability of said control device during the activation of the electromagnetic opening device.

An electromagnetically-actuatable door lock device for washing machine is also known (DE-OS 2 106 273), which uses a bimetal heated swing bolt to lock a locking latch of the door closure device such that the door cannot be opened. Only after the bimetal strip has cooled off again after the washing process and the locking latch releases can be washing machine door be opened. In this context too nothing is known about any measures for monitoring the operability of a control device controlling the door locking device.

A device for locking the door of a washing machine or a dishwasher is also already known (DE 196 01 228 A1), in which a locking element is provided, which is able to be moved into an open position in which it releases a door hook of the door to open said door, and which is able to be moved into a closing position in which it blocks the door hook at a door opening. Locking and unlocking positions of the locking element are controllable by means of a bistable pre-stressed element and a locking bolt. The said locking bolt is able to be moved by the bistable element so as to engage with the locking element in order to fix the latter in a closed position. The bistable element also pushes the locking bolt into an open position in which this is free from the locking element. The relevant known device thus features a bistable element which can be pre-stressed in two positions: In one position a movement of the locking element from its closed position into its open position is prevented, and in the other position a movement of the locking element from is closed position into its open position is enabled. However in this connection too nothing is specified about any measures for monitoring the operability of a control device controlling the relevant device.

BRIEF SUMMARY OF THE INVENTION

The underlying object of the invention, for a circuit arrangement of the type mentioned at the start, is to ensure that the control device provided for activation of the door lock actuator can also be monitored as regards its own operability during this activation, so that it can only control the door lock actuator if it is itself operating correctly.

The object stated above is achieved for a circuit arrangement of the type stated at the start by the invention in that, in the activation circuit of the door lock actuator lies a series circuit comprising two switching devices which are controllable by the control device which, in response to trigger signals intended for it, issues output signals for actuating the two switching devices.

The advantage provided by the invention is that in a relatively simple manner it can be ensured that the said control device only allows the door locking actuator to lock and/or unlock the door if on the output side it allows the required switching signals for control of the two series-connected switching devices to be issued. If the relevant control device is operating incorrectly so that on the output side it is not able to issue at least one of the two output signals, the required locking and/or unlocking of the door lock can no longer take place and thereby the electric appliance containing this door lock can no longer be put into operation. The operability of the control device is thus monitored by the issuing or non-issuing of the said output signals or signal.

Expediently the one switching device is formed by a working contact of a mechanical relay and the other switching device is formed by a load path of a semiconductor switch; in this case the mechanical relay with its relay winding and the semiconductor switch are able to be controlled with a control input of the control device which in response to specific trigger signals supplied to it allows output signals for exciting the relay winding and thereby for closing the associated make contact of the mechanical relay and for transferring the semiconductor switch into its conductive state to be issued. This produces the benefit of an especially low circuit outlay to implement the said switching devices. In addition this opens the way to achieving further benefits, as will be shown in more detail below.

In this context it should also be pointed out that the practice of feeding electrical loads via a series circuit of semiconductor switches, especially triacs and make contacts of mechanical relays, is basically known (DE 692 00 902 T2, DE 698 24 649 T2). The series circuits involved comprising semiconductor circuits and make contacts of mechanical relays are not used however in such cases to take account of monitoring and thereby of safety aspects relating to existing control devices, as is the case in the present invention.

Preferably the relay winding of the mechanical relay is able to be controlled by the control device before the activation of the semiconductor switch. This brings with it the advantage that the semiconductor switch can be easily through connected only once it has been activated.

Preferably a control input of the semiconductor switch is connected to the output of a pulse control circuit which, in response to its respective activation by the control device, allows at least one control pulse of specified duration to be issued to the semiconductor switch. This feature advantageously further increases the desired safety in relation to the control device. The relevant control device does not in fact control the said semiconductor switch directly but to a certain extent indirectly via the said pulse control circuit. This pulse control circuit can however only issue the at least one control pulse of a specified duration to the said semiconductor switch if it is activated by the relevant control device in the prescribed manner. If this activation is thus disturbed as a result of an incorrectly operating control device, for example by a continuous issuing of an output signal corresponding to one of the logical values "0" or "1", then there is no locking and/or unlocking of the said door lock since in this case the pulse control circuit cannot operate.

In accordance with a further useful embodiment of the invention the semiconductor switch is a triac. This gives the advantage of a semiconductor switch which is especially simple to activate and able to be used in an alternating current path. The make contact connected to the relevant triac in the series circuit ensures that when the associated relay winding is activated before the activation of the triac that this triac is not transferred in an undesired way into the conductive state by a so-called overhead ignition (dU/dt-ignition) as a result of noise pulses (EMC) occurring. This means that this useful development of the invention practically brings double benefits with it.

Preferably the triac is able to be activated by at least one current pulse of specified duration when current is fed to the door lock actuator of the door lock. This allows account to be taken in a relatively simple manner of the electrical load able to be imposed on the respective door lock actuator used. There are namely door lock actuators which only require a single pulse to activate them, amounting to a total duration corresponding to half the period duration of the alternating current, without sustaining damage or burning though. On the other hand there are however also door lock actuators which are able to be activated by a number of such individual pulses for a significantly longer duration without damage.

In accordance with a further useful embodiment of the invention the control device, when used in a device which comprises a work area able to be closed or opened by the door with a rotatable drum, can include device signals indicating the rotation/non-rotation of said drum for issuing of the trigger signals. This measure brings the advantage that a further safety aspect is able to be incorporated into the activation of the door lock actuator by this feature. By taking into account the device signals specifying a rotation/non-rotation of the rotatable drum, it is namely possible in a relatively simple manner to ensure that the door lock actuator performs a locking of the door lock for example as soon as any rotation of the relevant drum is established. This means that any person operating the device is then prevented from reaching into the drum which is now locked by the relevant door lock.

In accordance with a further useful embodiment of the invention the device signals previously mentioned are linked after evaluation in an evaluation device if necessary to the output signals able to be issued by the control device in a logic device and indeed in a logical ANDing device. This ensures in an especially simple way that the output signals issued by the control device are not the sole checking criterion for the effective activation of the said switching devices.

Preferably a control circuit controlling this relay coil is arranged between the output of the logic device and the relay coil of the mechanical relay. This gives the advantage of an especially simple activation option in relation to the mechanical relay.

In accordance with a further useful embodiment of the invention the door lock actuation device is a bistable magnetic lock actuator containing a magnetic coil which is locked or unlocked respectively in response to consecutive activations of its magnetic coil. This brings the advantage that said door lock has to be actively actuated in each case in order to lock and unlock it, in which case the monitoring and safety aspect addressed at the start of this document in respect of the control device is further enhanced.

BRIEF DESCRIPTION OF THE DRAWINGS

Explained in greater detail below with reference to a drawing is an exemplary embodiment shown schematically in said drawing of the circuit arrangement in accordance with the invention.

DETAILED DESCRIPTION OF THE PRESENT INVENTION

In the exemplary embodiment shown in the drawing of a circuit arrangement in accordance with the present invention it is assumed that this circuit arrangement belongs to an electric appliance not shown here in any greater detail here such as an electric washing machine which has an work area—i.e. a washing drum—which is to be closed or opened by means of a lockable door. The said washing drum of the relevant washing machine is put into motion by an electric motor M shown schematically in the drawing. The electric motor M can be an alternating current motor or a direct current motor; it is controlled by a drive control device AN in order to rotate the drum in accordance with the respective operating program. Such rotations include for example the motor and thereby the washing drum running at relatively high speeds to the right and to the left and for executing a washing program as well as a run at relatively high speed in the case of spin drying operation of the washing machine.

Connected to the electric motor M shown in the drawing is a so-called tachogenerator T, which on the output side issues output pulses corresponding to the speed of the electric motor M. A signal comprising these output pulses will, as will be shown below, be fed as a locking signal via the input line ELI to a door control device TS to which in the present case a microcontroller MC with associated software belongs as the actual control element. This microcontroller MC is connected by a first input terminal to the input line ELI, and the microcontroller MC is connected by a second input terminal to a further input line EL2 of the door control device TS. This further input line EL2 is connected via a so-called door contact 5 TK of the said washing machine to a feed voltage connection carrying a feed voltage Ul of e.g. +5V. The relevant door contact TK is closed when the door of the washing machine is closed mechanically. The feed voltage subsequently fed to the microcontroller MC via the door control device TS via the input line EL2 represents to some extent a preparation signal to which—as will be shown in more detail below—an electronic locking of the door lock associated with said door is able to be undertaken as soon as the motor M starts to turn.

The aforementioned microcontroller MC also features two separate outputs which are connected to output lines AL1, AL2 of the door control device TS.

It should be noted at this point that the relevant control device TS can be implemented by other components, such as for example by a microprocessor with associated peripherals such as with ROM in which items such as a control program for controlling the still to be considered door lock activation device is stored and with RAM which can serve as a working memory for the microcomputer comprising the said components.

Connected to the output line AL1 of the door control device TS in the present case is the one input of the logic circuit VG which can for example be embodied by an AND element UG featuring two inputs and one output. This AND element UG is connected by its one input to the said output line AL1, and by its other input the relevant AND element UG of the logic circuit VG is connected to the output of an evaluation circuit AS. This evaluation circuit AS features a mean-value generation device MW connected on the input side to the output of the tachogenerator T and a threshold value device SW arranged downstream from this. This threshold value device SW is at a threshold value voltage U2 which defines a threshold value, which, if the predetermined output voltage of the relevant threshold value circuit SW output by the mean-value generation circuit MW is exceeded by in each case, a specific output signal, for example an output signal corresponding to a logical signal level of "0" is issued; otherwise the threshold value circuit SW would issue an output signal corresponding to a logical level of "1".

It should also be pointed out here that the mean-value generation circuit MW can be embodied by a circuit known per se for forming the mean value of pulse voltages fed to it on the input side. In a corresponding way the threshold value circuit SW can be implemented by a known threshold value circuit, for example by an individual bipolar transistor, to the base of which is fed an output voltage or output signal of the mean-value generation circuit MW and of which the emitter carries a voltage forming the said threshold voltage U2.

Connected on its input side to the output of the logic circuit VG is a relay control circuit RS representing an activation circuit. This relay control circuit RS includes, as shown in the exemplary embodiment in the drawing, a bipolar transistor Q of the npn-conductivity type, in the collector circuit of which the relay winding of a mechanical relay RE lies here. This relay RE includes a make contact AR, with which the main or load path of a semiconductor switch TR lies in series. The relevant semiconductor switch TR is embodied in the present case by a triac; it should be noted at this point however that another semiconductor switch can in principle also be used here and that the make contact AR can also be replaced by the main path of a semiconductor switch; in the last case mentioned the previously mentioned relay control circuit is replaced by a semiconductor control circuit. The triac TR mentioned is also connected by its control electrode to the output of a pulse control circuit IS, which is connected on the input side to the above-mentioned output line AL2 of the door control device TS.

The series circuit considered above, consisting of the make contact AR of the mechanical relay RE and the main or load path of the triac TR, lies via an electric door lock activation device or door locking device TV between a phase conductor P and a neutral conductor N of an alternating current source associated with this, which in the present case might be a single-phase network alternating current source, which would output a 50-Hz a.c. supply voltage of 230 Veff.

The electric door locking actuator or door locking device TV already mentioned includes a magnetic coil SM and a locking element able to be actuated by said coil, with which the door lock not shown in the drawing, to which the relevant circuit arrangement belongs, can be locked or unlocked. The door lock actuator or door locking device in the present example might involve a bistable door locking device which, in response to consecutive activations of the magnetic coil MS, respectively locks or unlocks the associated door lock. It should be noted however that the relevant door locking device can also be embodied by a monostable door locking device or by a monostable door unlocking device. In the first case the monostable door locking device would lock the associated door lock merely for the duration of the activation of its associated magnetic coil, and in the second case the monostable door unlocking device would unlock the associated door lock merely for the duration of the excitation of the associated magnetic coil.

Now that the layout of the circuit arrangement in accordance with one embodiment of the present invention has been explained to the required extent, more details will be provided as to the method of operation of this circuit arrangement. This is based on the assumption that the door lock actuator or door locking device TV is the bistable door lock actuator or door locking device mentioned.

When the electric motor M stops, i.e. the washing machine forming the assumed electric appliance is stopped and the control contact TK is closed as a result of the door of the relevant washing machine being closed, the tachogenerator T coupled to the electric motor M does not issue any output pulses. The microcontroller MC contained in the door control device TS detects however as a result of the feed voltage Ul fed to it via the control contact TK, that the door of the washing machine is mechanically closed and where necessary is to be locked electrically. At this point in time however neither the microcontroller MC via the input line EL1 nor the evaluation circuit AS receive trigger signals that can be evaluated for locking the door lock not shown in the drawing. In this state the door control device TS also does not issue via its output lines ALI and AL2 any such output signals, that on the one hand the relay control circuit RS and on the other the pulse control circuit IS will be activated on the input side. This means that the make contact AR belonging to the mechanical relay RE remains in its rest position, and the triac TR connected to the output of the pulse control circuit IS remains in the blocked state. The magnetic coil MS of the door lock actuator or door locking device TV can thus not be excited. The locking element TU to be designated as the door lock can thus also not be brought into its locking position. As a result the door lock of the door of the washing machine assumed to be the appliance for the purposes of the invention cannot be electrically locked in this operating state.

If the electric motor M however begins to turn and a speed of for example 2 $min^{-1}$ is not yet exceeded, on the one hand the output pulses able to be emitted by the tachogenerator connected to the electric motor M might be sufficient both in amplitude an also in frequency to continue to feed back to the evaluation circuit AS an output signal corresponding to a logical value of "1" to the one input of the AND element UG of the logic circuit VG.

On the other hand the output pulses issued by the tachogenerator T in this case, which are fed via the input line EL1 of the door control unit TS and in this to the microcontroller MC, might however lead to corresponding output signals or pulses, such as output signals or pulses with a logical value of "1" of a specific defined duration being issued via the output lines AL1 and AL2. In this case such output signals or pulses are initially preferably output via the output line AL1 and only after a certain defined period of time has elapsed via the output line AL2.

The output signal output via the output line AL1 with the logical level "1" causes the AND element UG in the logic circuit VG to issue via its output an output signal corresponding to the logical value "1" of for example +5V, which is fed to the relay control circuit RS on the input side. This output signal leads to the transistor Q of the relay control circuit RS reaching the conductive state, whereby the relay RE lying with its relay winding in the collector circuit of the transistor Q is excited. This closes the make contact AR belonging to this relay RE.

A short period of time after closing the make contact AR of the relay RE—here a debouncing of the relevant make contact AR is preferably taken into account—the door control device TS outputs via its output lines AL2 an output signal activating the pulse control circuit IS or pulse of a defined duration corresponding to the logical value "1". Subsequently the pulse control circuit IS issues at least one activation pulse of a defined duration to the control electrode of the triac TR. This duration depends, as already described above, on the load able to be imposed on the magnetic coil of the door lock actuator or door locking device TV. The relevant duration can for example amount to half a period of the above-mentioned 50 Hz a.c. supply voltage, i.e. 10 ms. During this time, especially for a safe activation of the triac, a number of single pulses can also be emitted, for example 5 kHz pulses. When a door lock actuator or door locking device TV is used for which a different load can be imposed on the associated magnetic coil MS, a number of pulses or even a continuous current signal can be output.

The series connection of the make contact AR of the relay RE and the main path of the triac TR also ensures that a so-called overhead ignition, meaning a self-induced ignition of the triac—as can occur for example with the sole use in the circuit with the magnetic coil MS as a result of a voltage increase at the triac main path, for example because of noise pulses (EMC) at the control input of the relevant triac—is prevented.

After the described issuing of output signals via the output lines AL1 and AL2 of the door control device TS the activations of the relay control circuit RS and the impulse control circuit IS stop, and with the result that the make contact AR associated with the relay RE is opened again and that the triac TR goes into its locking state again. The door locking device TV, which according to the assumption is a bistable door lock actuator or door locking device TV, remains however in the locking state that it has now assumed, in which the door of the washing machine provided according to the assumption remains locked.

Only when the electric motor M has again reached a predetermined speed or falls below this speed, as for example 2 $min^{-1}$, will the door control device TS and the evaluation circuit AS become active again. In this case the microcontroller MC evaluates the signal now issued by the tachogenerator T as a release signal for unlocking the door locking device TV, at which point on the one hand the logic circuit VG can once again be activated accordingly by the door control device TS for activation of the relay control circuit RS and at which point on the other hand the pulse control circuit IS can be activated again by the door control device TS. This again activates the make contact AR of the relay RE and the triac with its main path in the corresponding manner, as has been explained above. In the present case however the magnetic coil MS of the door lock actuator or door locking device TV is excited with the result that the door lock or the locking element TU now unlocks again. This allows the door of the washing machine to be opened again by actuating the associated mechanical door lock.

The duplicate detection and evaluation of the output pulses issued by the tachogenerator T explained above which, if present in a sufficient number, lead to a trigger signal or locking signal for actuating the door lock actuator or door locking device TV, namely on the one hand in the door control device TS and on the other in the evaluation circuit AS with downstream logic circuit VG, means that a higher safety standard can be achieved than would be the case without these circuit measures. Through the additional inclusion of the evaluation circuit AS with the downstream logic circuit VG and the pulse control circuit IS it is namely ensured that above all in the door control device TS and in its microcontroller MC any errors which may occur with permanent issuing of specific logic signals "0" or "1" of corresponding signal potentials cannot lead to incorrect activation of the door lock actuator or door locking device TV. This means that the safety of the activation of the relevant door lock actuator or door locking device TV in relation to its simple activation solely through the door control device TS is greatly improved.

LIST OF REFERENCE SYMBOLS

AL1, AL2 Output lines
AN Drive control device
AR Make contact
AS Evaluation circuit
EL1, EL2 Input lines
IS Pulse control circuit
M Electric motor
MC Microcontroller
MS Magnetic coil
MW Mean-value generation circuit
N Neutral line
P Phase line
Q Bipolar transistor
RE Relay
RS Activation circuit, relay control circuit
SW Threshold value device
T Tachogenerator
TK Door contact
TR Semiconductor switch, triac
TS Door control device
TU Locking element, door bolt
TV Door lock actuator or door locking device
U1 Feed voltage
U2 Threshold voltage
UG AND element
VG Logic circuit

The invention claimed is:

1. A circuit arrangement for locking and/or unlocking a door lock comprising:
- an electrically-actuatable door lock actuator;
- a locking element;
- wherein the lock actuator acts on the locking element for locking or unlocking the door lock in response to current flowing through the lock actuator;
- a control device;
- a series circuit including the lock actuator and two switching devices controllable by the control device;
- the control device issuing output signals for actuating the two switching devices in response to predetermined triggering signals; and
- a mechanical relay having a make contact and a relay winding;
- wherein one of the switching devices is the make contact of the mechanical relay and the other switching device is a load path of a semiconductor switch; and the mechanical relay with its relay winding and the semiconductor switch are controllable by a control input of the control device, which in response to predetermined triggering signals allows output signals to be issued for exciting the relay winding and for closing the associated make contact of the mechanical relay and for transferring the semiconductor switch into its conductive state,
- wherein the relay winding of the mechanical relay is controllable by the control device before activation of the semiconductor switch.

2. The device as claimed in claim 1, wherein the semiconductor switch is a triac.

3. The circuit arrangement as claimed in claim 2, wherein the triac is controlled by at least one current pulse of an alternating current of predetermined duration upon the control device issuing the output signals.

4. The circuit arrangement as claimed in claim 1, wherein the door lock actuator is a bistable door lock actuator including a magnetic coil which, in response to consecutive activations of its magnetic coil, is locked or unlocked respectively.

5. The circuit arrangement as claimed in claim 1, further including a door for closing and opening a work area of an electric appliance.

6. A circuit arrangement for locking and/or unlocking a door lock comprising:

an electrically-actuatable door lock actuator;
a locking element;
wherein the lock actuator acts on the locking element for locking or unlocking the door lock in response to current flowing through the lock actuator;
a control device;
a series circuit including the lock actuator and two switching devices controllable by the control device;
the control device issuing output signals for actuating the two switching devices in response to predetermined triggering signals;
a mechanical relay having a make contact and a relay winding;
wherein one of the switching devices is the make contact of the mechanical relay and the other switching device is a load path of a semiconductor switch; and the mechanical relay with its relay winding and the semiconductor switch are controllable by a control input of the control device, which in response to predetermined triggering signals allows output signals to be issued for exciting the relay winding and for closing the associated make contact of the mechanical relay and for transferring the semiconductor switch into its conductive state;
a pulse control circuit; and
a control input of the semiconductor switch being connected at the output of the pulse control circuit which, in response to a respective activation of the control device, allows at least one activation pulse of a predetermined duration to be issued to the semiconductor switch.

7. A circuit arrangement for locking and/or unlocking a door lock comprising:

an electrically-actuatable door lock actuator;
a locking element;
wherein the lock actuator acts on the locking element for locking or unlocking the door lock in response to current flowing through the lock actuator;
a control device;
a series circuit including the lock actuator and two switching devices controllable by the control device;
the control device issuing output signals for actuating the two switching devices in response to predetermined triggering signals;
a work area having a rotatable drum;
wherein the work area is able to be locked or released by the lock, the control device being able to incorporate device signals specifying rotation or non-rotation of the rotatable drum for issuing the predetermined triggering signals; and
an evaluation device and a logic device, wherein the device signals which occur after evaluation in the evaluation device, are logically combined with the output signals issued by the control device in the logic device.

8. The circuit arrangement as claimed in claim 7 wherein the logic device is an AND logic device.

9. The circuit arrangement as claimed in claim 7 further including an activation circuit; the activation circuit arranged between the output of the logic device and the relay coil of the mechanical relay for activating the relay coil.

10. A laundry appliance comprising:

a work area having a rotatable drum;
a door for closing and opening the work area;
a door lock for locking and/or unlocking the door; and
a circuit arrangement for locking and/or unlocking the door lock,
wherein the circuit arrangement includes:
a series circuit including an electrically-actuatable door lock actuator and two switching devices;
a locking element, wherein the lock actuator acts on the locking element for locking or unlocking the door lock in response to current flowing through the lock actuator; and
a control device that controls the two switching devices by issuing output signals for actuating the two switching devices in response to predetermined triggering signals,
wherein the predetermined triggering signals are based on device signals specifying rotation or non-rotation of the rotatable drum,
wherein the control device actuates the door lock to lock the door in response to the device signals specifying rotation of the rotatable drum, and
wherein the control device actuates the door lock to unlock the door in response to the device signals specifying non-rotation of the rotatable drum.

11. The laundry appliance of claim 10, wherein the semiconductor switch is a triac.

12. The laundry appliance of claim 11, wherein the triac is controlled by at least one current pulse of an alternating current of predetermined duration upon the control device issuing the output signals.

13. The laundry appliance of claim 10, wherein the door lock actuator is a bistable door lock actuator including a magnetic coil which, in response to consecutive activations of its magnetic coil, is locked or unlocked respectively.

14. A laundry appliance comprising:

a work area having a rotatable drum;
a door for closing and opening the work area;
a door lock for locking and/or unlocking the door; and
a circuit arrangement for locking and/or unlocking the door lock,
wherein the circuit arrangement includes:
a series circuit including an electrically-actuatable door lock actuator and two switching devices;
a locking element, wherein the lock actuator acts on the locking element for locking or unlocking the door lock in response to current flowing through the lock actuator; and
a control device that controls the two switching devices by issuing output signals for actuating the two switching devices in response to predetermined triggering signals,
a mechanical relay having a make contact and a relay winding;
wherein one of the switching devices is the make contact of the mechanical relay and the other switching device is a load path of a semiconductor switch; and
the mechanical relay with its relay winding and the semiconductor switch are controllable by a control input of the control device, which in response to predetermined triggering signals allows output signals to be issued for exciting the relay winding and for closing the associated make contact of the mechanical relay and for transferring the semiconductor switch into its conductive state, wherein the relay winding of the mechanical relay is controllable by the control device before activation of the semiconductor switch.

15. A laundry appliance comprising:

a work area having a rotatable drum;

a door for closing and opening the work area;

a door lock for locking and/or unlocking the door; and a circuit arrangement for locking and/or unlocking the door lock, wherein the circuit arrangement includes:

a series circuit including an electrically-actuatable door lock actuator and two switching devices;

a locking element, wherein the lock actuator acts on the locking element for locking or unlocking the door lock in response to current flowing through the lock actuator; and a control device that controls the two switching devices by issuing output signals for actuating the two switching devices in response to predetermined triggering signals, a mechanical relay having a make contact and a relay winding;

wherein one of the switching devices is the make contact of the mechanical relay and the other switching device is a load path of a semiconductor switch;

the mechanical relay with its relay winding and the semiconductor switch are controllable by a control input of the control device, which in response to predetermined triggering signals allows output signals to be issued for exciting the relay winding and for closing the associated make contact of the mechanical relay and for transferring the semiconductor switch into its conductive state; and a pulse control circuit;

a control input of the semiconductor switch being connected at the output of the pulse control circuit which, in response to a respective activation of the control device, allows at least one activation pulse of a predetermined duration to be issued to the semiconductor switch.

16. A laundry appliance comprising:

a work area having a rotatable drum;

a door for closing and opening the work area;

a door lock for locking and/or unlocking the door; and a circuit arrangement for locking and/or unlocking the door lock, wherein the circuit arrangement includes:

a series circuit including an electrically-actuatable door lock actuator and two switching devices;

a locking element, wherein the lock actuator acts on the locking element for locking or unlocking the door lock in response to current flowing through the lock actuator; and a control device that controls the two switching devices by issuing output signals for actuating the two switching devices in response to predetermined triggering signals, an evaluation device and a logic device, wherein device signals which occur after evaluation in the evaluation device, are logically combined with the output signals issued by the control device in the logic device.

17. The laundry appliance of claim 16, wherein the logic device is an AND logic device.

18. The laundry appliance of claim 16, including an activation circuit; the activation circuit arranged between the output of the logic device and the relay coil of the mechanical relay for activating the relay coil.

* * * * *